(12) United States Patent
Hougland et al.

(10) Patent No.: US 7,615,243 B2
(45) Date of Patent: Nov. 10, 2009

(54) METHOD FOR PEELING AGRICULTURAL PRODUCTS HAVING SKINS

(76) Inventors: Jerry M. Hougland, 11924 Victory Ave., Oakdale, CA (US) 95361; Todrick G. Harter, 2640 Kensington, Turlock, CA (US) 95382; Zvi Albert, K.K.L. Street 14, K. Bialik (IL) 27093

( * ) Notice: Subject to any disclaimer, the term of this patent is extended or adjusted under 35 U.S.C. 154(b) by 624 days.

(21) Appl. No.: 11/170,163

(22) Filed: Jun. 30, 2005

(65) Prior Publication Data

US 2007/0003676 A1 Jan. 4, 2007

(51) Int. Cl.
 *A23L 1/216* (2006.01)
(52) U.S. Cl. .................... 426/482; 426/483; 426/511
(58) Field of Classification Search ............. 426/482, 426/483, 511
 See application file for complete search history.

(56) References Cited

U.S. PATENT DOCUMENTS

| | | | | |
|---|---|---|---|---|
| 3,602,282 | A | * 8/1971 | Hirahara, Katsuji | 426/287 |
| 3,627,011 | A | * 12/1971 | Pond | 426/482 |
| 3,769,439 | A | * 10/1973 | Kafejiev et al. | 426/233 |
| 3,959,506 | A | * 5/1976 | Kunz | 426/482 |
| 4,315,039 | A | 2/1982 | Levati | |
| 4,335,572 | A | 6/1982 | Pope | |
| 4,493,851 | A | 1/1985 | Silvestrini | |
| 4,562,772 | A | * 1/1986 | Battistini | 99/472 |
| 4,707,372 | A | 11/1987 | Catelli | |
| 4,760,780 | A | 8/1988 | Silvestrini et al. | |
| 4,770,887 | A | 9/1988 | Tarry et al. | |
| 5,033,372 | A | 7/1991 | Silvestrini | |
| 5,168,802 | A | 12/1992 | Silvestrini et al. | |
| 5,732,615 | A | 3/1998 | Harvey et al. | |
| 5,786,014 | A | 7/1998 | Creed et al. | |
| 5,843,507 | A | 12/1998 | Harvey et al. | |
| 6,311,611 | B1 | 11/2001 | Frenkel et al. | |
| 6,375,996 | B1 | 4/2002 | Suter et al. | |
| 6,427,584 | B1 | 8/2002 | Thomas et al. | |
| 6,517,881 | B2 | 2/2003 | Elizondo et al. | |
| 6,575,085 | B2 | 6/2003 | Thomas et al. | |
| 6,612,226 | B2 | 9/2003 | Schrader et al. | |

OTHER PUBLICATIONS

"Efficient Peeling Technology", Food Manufacturing Coalition (FMC), Project Code: PT-2-B-(14), 3 pgs., Jun. 28, 1996.

(Continued)

*Primary Examiner*—Anthony Weier
(74) *Attorney, Agent, or Firm*—Barnes & Thornburg LLP (57) ABSTRACT

A method of peeling agricultural products having skins, including the steps of: immersing the agricultural products to be peeled in a treating solution in a first area of a peeling apparatus, and forming a mixture at a first pressure; transporting the mixture in a second area, the second area having a first end at the first pressure and a second end at a second pressure; transporting the mixture in a third area, the third area being at an essentially constant second pressure; transporting the mixture in a fourth area, the fourth area having a first end at the second pressure and having a second end at a third pressure that is essentially equal to the first pressure and transporting the mixture to a separator at essentially the third pressure. An apparatus for peeling agricultural products having skins in accordance with the method is also provided.

21 Claims, 4 Drawing Sheets

OTHER PUBLICATIONS

G. Jeffrey Hoch, "Technologies With A Peel", 3 pgs., Sep. 1, 2003.
Sudhir K. Sastry et al., "Process For Peeling Tomatoes", Agriculture and Food Services, 2 pgs., Dec. 11, 2002.
Cavalieri S.p.A., "Tomato Processing System", 2 pgs., Sep. 1, 2003.
"Tomato Steam Peeler Model SP-30", 5 pgs., Aug. 31, 2003.
Tomato Division, Pomesco, New Thermophysical Peeling Group, 11 pgs., undated.

* cited by examiner

METHOD FOR PEELING AGRICULTURAL PRODUCTS HAVING SKINS

BACKGROUND

The present disclosure relates, in general, to apparati and methods for peeling agricultural products having skins. Machines and processes for peeling agricultural products are known to employ heat in the form of steam or hot water, as well as caustic solution and mechanical devices. The present disclosure relates more particularly, to apparati and methods that include the use of heated, caustic liquids or unheated, non-caustic liquids and pressure changes to remove skins from agricultural products, such as, for example, tomatoes.

SUMMARY

In accordance with a presently disclosed method, products to be peeled are immersed in a treating solution to form a mixture. The mixture is transported through a series of passageways over predetermined periods of time undergoing at least one change in elevation within one or more of the passageways. The change in elevation results in a pressure change which, in cooperation with the treating solution and the transport over the predetermined periods of time, results in at least a partial separation or peeling of the skin from the product. The apparati include a source of treating solution, a peeling conduit having a plurality of sequentially connected passageways, and peeling means to at least partially remove the skin from the immersed products.

Other aspects of the present disclosure will become apparent from the following descriptions when considered in conjunction with the accompanying drawings.

DETAILED DESCRIPTION

Figure 1:
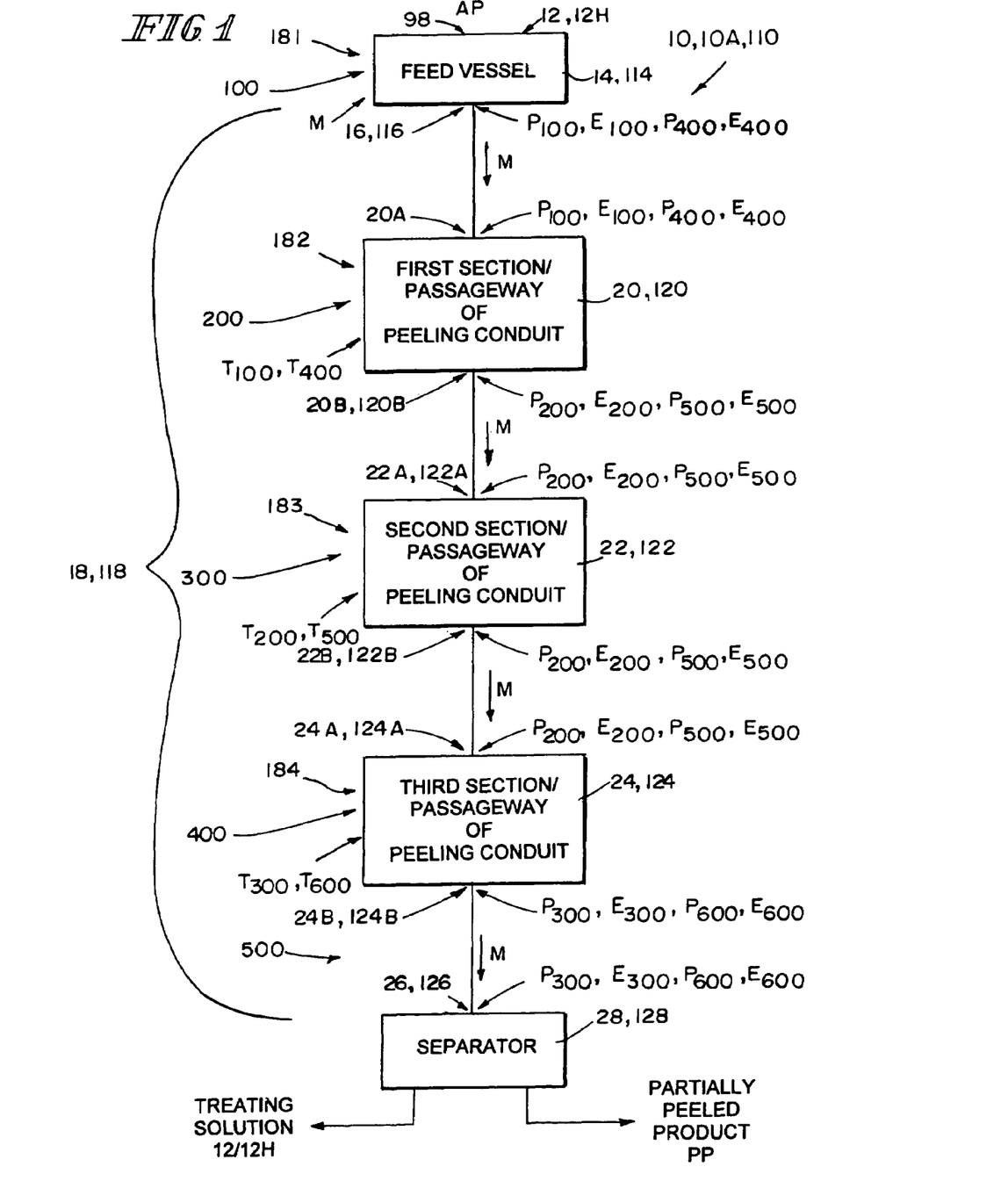
FIG. 1 is a block diagram illustrating portions of an embodiment of a peeling apparatus and a method of peeling agricultural products, according to the present disclosure.
Figure 2:
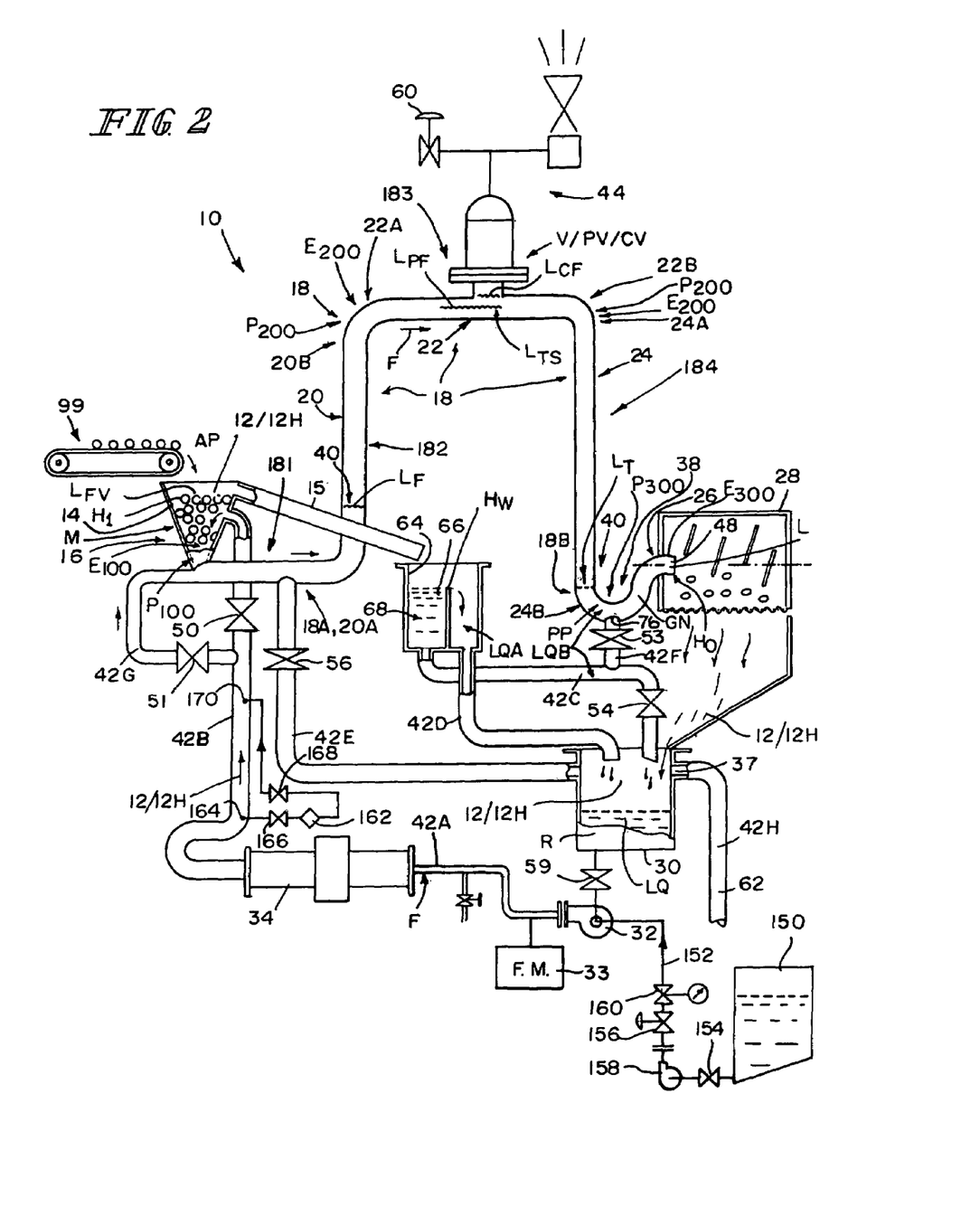
FIG. 2 is a schematic, side elevational view of an embodiment of a peeling apparatus, according to the present disclosure.
Figure 3:
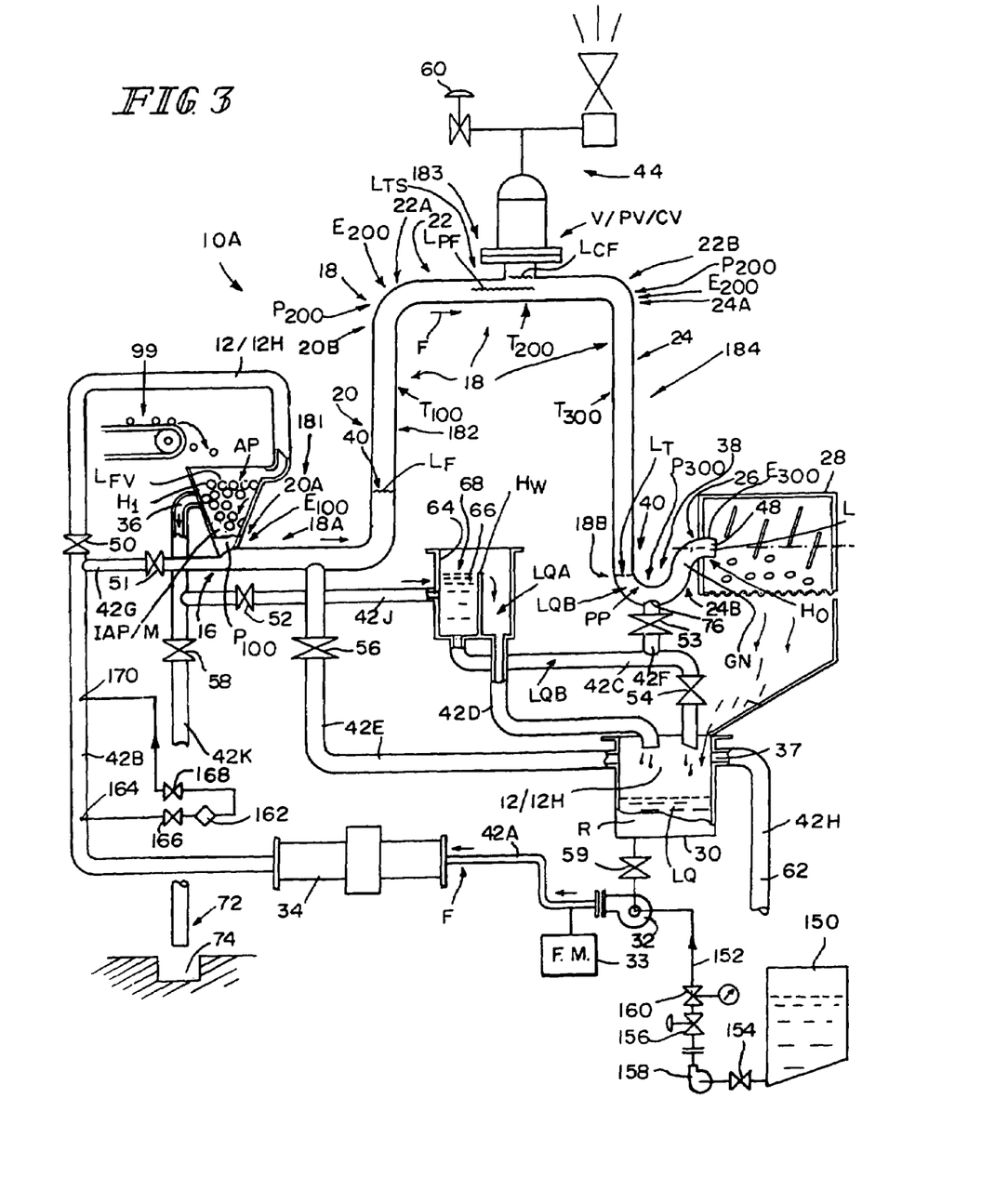
FIG. 3 is a schematic, side elevational view of another embodiment of a peeling apparatus, according to the present disclosure.
Figure 4:
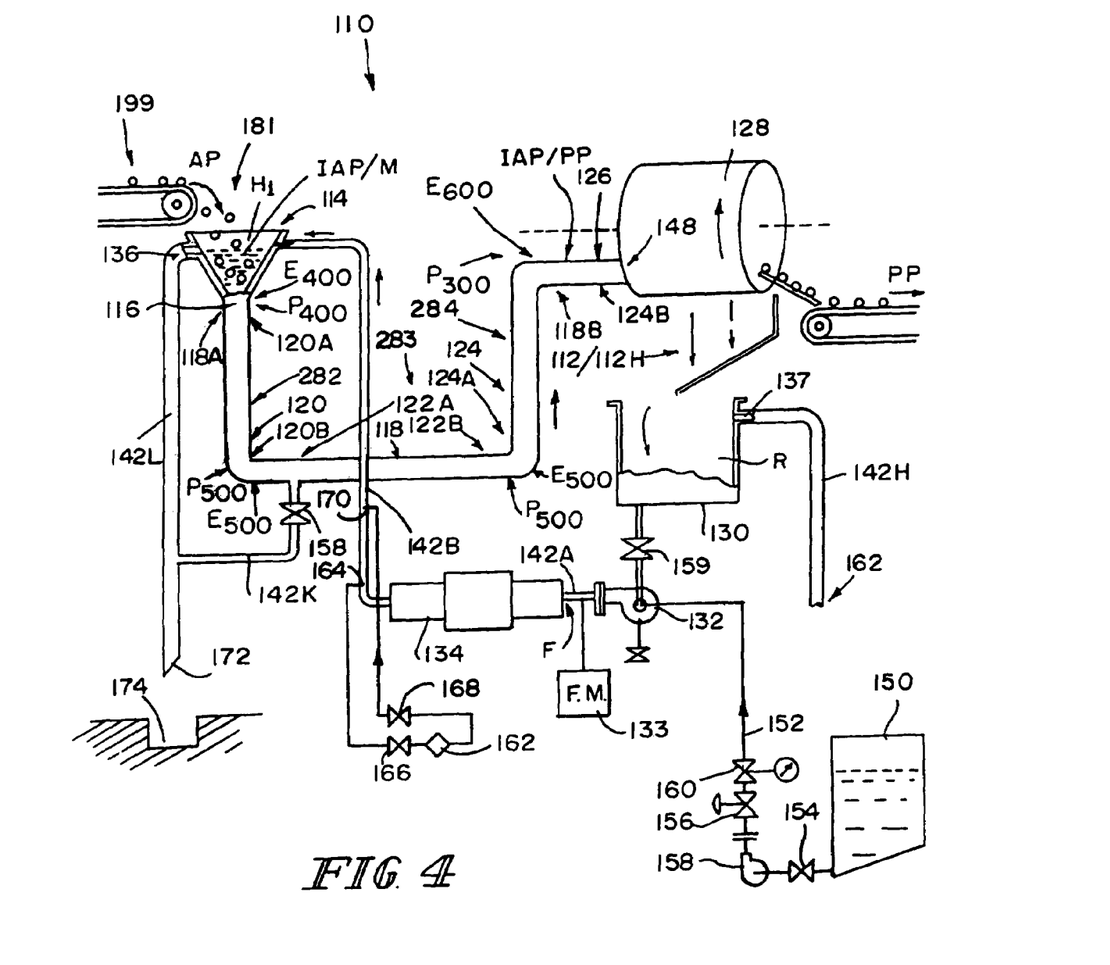
FIG. 4 is a schematic, side elevational view of another embodiment of a peeling apparatus, according to the present disclosure.

Generally, the present disclosure relates to a method of peeling agricultural products having skins, as shown, for example, in the block diagram of FIG. 1. FIGS. 2-4 show embodiments of an apparatus employed to implement the method suggested in FIG. 1. The products to be peeled are immersed in a treating solution forming a mixture that undergoes, inter alia, changes in elevation and pressure during the mixture's journey through areas of the apparatus. The treating solution may be heated and may contain caustic soda and/or enzymes.

For convenience, in the drawings the same reference numbers are used to represent the same or essentially the same structural elements and measurements (i.e., pressure, elevation etc.). However, in FIG. 4, structural elements are represented by reference numbers in the "100" and "200" series (i.e., element "20" in FIGS. 1-3 is identified as "120" in FIG. 4 and measurements also use reference numbers in a different series, i.e., "400"-"600"). As will be further discussed herein, the embodiments of FIGS. 2 and 3 represent apparati, according to the present disclosure, that include a vacuum system and a configuration of structural elements, such as a peeling conduit, resulting in an initial increase in elevation of the mixture of treating solution and products to be peeled. However, the embodiment shown in FIG. 4 does not include a vacuum system but does include a configuration of structural elements resulting in an initial decrease in elevation of the mixture of treating solution and products to be peeled.

In general, apparati 10, 10A, 110 for peeling agricultural products AP having skins are shown in FIGS. 2-4. In general, a method of peeling the products AP, in one or more of the apparati 10, 10A, 110 is illustrated in the flow diagram of FIG. 1. Using FIG. 1 to provide an overview of the method suggested above, products AP are delivered 98 to a feed vessel 14. Feed vessel 14 is at least partially filled with treating solution 12. The treating solution 12 may be heated, resulting in a heated treating solution, designated as 12H, being fed into the feed vessel 14. References to the treating solution may thus carry a designation of 12 or 12H or 12, 12H. The products AP are immersed 100 in the treating solution 12 or 12H forming a mixture M in an area 181 of apparatus 10. The feed vessel 14 is located at a first elevation $E_{100}$ and is at a first pressure $P_{100}$. Each apparatus 10, 10A, 110 includes a peeling conduit 18 or 118 having areas 181, 182, 183 and 184 (see FIGS. 1-4). Mixture M, including the products AP immersed in the treating solution 12 or 12H, exits the feed vessel 14 at output opening 16 and is transported 200 into a peeling conduit 18. Mixture M enters into first end 20A of a first section or passageway 20 of peeling conduit 18. First end 20A is at first elevation $E_{100}$ and first pressure $P_{100}$. Mixture M continues through first section 20 over a first predetermined period of time $T_{100}$ in area 182 and exits at second end 20B. Second end 20B is at a second elevation $E_{200}$ and a second pressure $P_{200}$. Mixture M is further transported 300 into first end 22A of a second section or passageway 22 of peeling conduit 18. First end 22A is at second elevation $E_{200}$ and second pressure $P_{200}$. Mixture M continues through second section 22 over a second predetermined period of time $T_{200}$ in area 183 and exits at second end 22B. Second end 22B is at elevation $E_{200}$ and pressure $P_{200}$. Mixture M is further transported 400 into first end 24A of a third section or passageway 24 of peeling conduit 18. First end 24A is at second elevation $E_{200}$ and pressure $P_{200}$. Mixture M continues through third section 24 over a third predetermined period of time $T_{300}$ in area 184 and exits at second end 24B. Second end 24B is at a third elevation $E_{300}$ and at a third pressure $P_{300}$. Mixture M, as it exits second end 24B, includes at least partially peeled product PP. Mixture M is further transported 500 to a separator 28 via discharge end 26 of peeling conduit 18. In the separator 28, the treating solution 12, 12H is circulated to a treating solution tank (see FIGS. 2-4) and the partially peeled product PP is further processed either in the separator 28 or transported elsewhere (not shown).

Turning to the apparati of the present disclosure, FIG. 2 shows an embodiment of an apparatus 10 for peeling agricultural products AP having skins. Apparatus 10 includes a treating solution tank 30 configured to be a source or reservoir R of treating solution 12. Tank 30 also is configured to receive non-heated or heated treating solution 12 or 12H that has been circulated through apparatus 10. A pump 32 is connected via a valve 59 to tank 30. Pump 32 is also connected to a heating device 34, via pipe 42A. Heating device 34, when turned on, is configured to heat the treating solution 12 to a desired temperature. Heating device 34 may, for example, be a heat exchanger. Pump 32 is configured to control a flow rate F of either the treating solution 12, 12H and/or mixture M through the apparatus 10. A flow meter 33 may be connected to an outlet area of pump 32 to indicate the hydraulic volume of treating solution being circulated. Heating device 34 is connected to feed vessel 14 via pipe 42B and valve 50. A peeling conduit 18, including sections 20, 22 and 24, is connected at one end 18A to the feed vessel 14 and at its other end 18B to a separator 28 via discharge connection 26 of peeling conduit 18. Feed vessel 14 is connected at an overflow opening 36 to a container 64 via an overflow channel 15.

The overflow channel 15 carries an overflow of treating solution 12, 12H into a reservoir 68 in container 64. Container 64 is at least partially divided by a weir 66 having a height $H_w$. The height $H_w$ is, for example, lower then a height $H_o$ of an outlet end 48 of peeling conduit 18 and is also lower than a level L of treating solution 12, 12H and/or mixture M existing at outlet end 48. Reservoir 68 can be drained via pipe 42C and valve 54 into treating solution tank 30. An overflow of treating solution 12, 12H over weir 66 drains into treating solution tank 30 via pipe 42D, providing an escape for excess treating solution 12, 12H in case pump 32 pumps too much treating solution 12, 12H or feed vessel 14 becomes clogged, or during start up. When opened, valve 56 permits a draining of treating solution 12, 12H from section 20 of peeling conduit 18 into treating solution tank 30 via pipe 42E. Treating solution 12, 12H can also be drained from section 24 of peeling conduit 18 into treating solution tank 30 via opening 76 in gooseneck GN, valve 53 (when opened), pipe 42F and valve 54 (when also opened) via pipe 42C. Treating solution 12, 12H draining from the reservoir 68 out a bottom of container 64 may flow into tank 30 or into gooseneck GN of peeling conduit 18 depending on the status of valves 53 and 54. Treating solution tank 30 can drain an overflow via opening 37, pipe 42H and vent 62. Apparatus 10 is configured such that pump 32 can feed treating solution 12, 12H directly to peeling conduit 18. That may be done by closing valve 50 and opening valve 51, whereby treating solution 12, 12H will be fed via pipes 42A, 42B and 42G to peeling conduit 18. Such flow of treating solution 12, 12H may be useful in helping to unblock a clog at output opening 16.

Apparatus 10 in FIG. 2 is shown to also include a vacuum system 44 sealably connected to peeling conduit 18 at, for example, section 22. Vacuum system 44 includes a vacuum level control 60 and is configured to provide a desired vacuum level V, which could be a partial vacuum PV or complete vacuum CV, in peeling conduit 18. The vacuum system 44, inter alia, causes the treating solution 12, 12H and/or the mixture M to rise in elevation in peeling conduit 18 and also may assist in preventing a vapor lock of a siphon effect 38 created at outlet end 48 (further discussed below).

Apparatus 10 is arranged such that output opening 16 of feed vessel 14 is located at first elevation $E_{100}$ and is at a first pressure $P_{100}$. Such first pressure $P_{100}$ may, for example, be essentially atmospheric pressure PA or approximately 14.9 pounds per square inch, absolute (PSIA). As shown in FIG. 2, peeling conduit 18 is arranged such that section 20 is connected to feed vessel 14 at opening 16 and continues essentially at elevation $E_{100}$ in area 181 of peeling conduit 18. Section 20 then rises in elevation through area 182 of peeling conduit 18 to second elevation $E_{200}$ which is at second pressure $P_{200}$. Second elevation $E_{200}$ is approximately 1-30 feet higher than first elevation $E_{100}$ and may be, in a particular mode, approximately eleven (11) feet higher than first elevation $E_{100}$. Second pressure $P_{200}$ is lower than first pressure $P_{100}$ and may be approximately nine (9) PSIA. Section 20 connects to section 22 at second elevation $E_{200}$ and continues at second elevation $E_{200}$ and second pressure $P_{200}$ through area 183 of peeling conduit 18. Section 20 connects to section 24 at second elevation $E_{200}$ and second pressure $P_{200}$. Section 24 drops in elevation through area 184 of peeling conduit 18 and reaches an elevation essentially equal to first elevation $E_{100}$, where section 24 connects to separator 28 via discharge connection 26.

The peeling conduit 18 is constructed such that an inside diameter is approximately 1-48 inches and may, in a particular mode, be approximately 14 inches in diameter, for example, when the agricultural products AP are tomatoes.

Treating solution 12 includes an active ingredient that may include one or more of the following: a) sodium hydroxide, b) potassium hydroxide and c) one or more enzymes. Sodium hydroxide and potassium hydroxide are known as caustic sodas. Other caustic solutions may be used. Generally, if the treating solution 12 is heated, then enzymes are not included with caustic soda in the treating solution 12. However if the treating solution 12 is not heated, then one or more enzymes may be added. It is within the scope of the present disclosure that the treating solution, heated or not, could only include one or more enzymes. The active ingredient, whether caustic soda and/or enzymes, is generally purchased in concentrated form and is then mixed, for example, with water to create treating solution 12/12H of a desired concentration. Such treating solution 12/12H concentrations may, in a particular mode, be approximately 2-10% by weight, for example, when the agricultural products AP are tomatoes. When heated, the treating solution 12/12H is heated to a temperature of approximately 50°- 250° F. In a particular mode, the heated treating solution 12H may be heated to a temperature of approximately 190°, for example, when the agricultural products AP are tomatoes. Treating solution 12/12H concentrations and temperatures for other products may be as follows: 1) pears—same as tomatoes; 2) apples—same as tomatoes; 3) kiwi—a concentration of 3-10% by weight and a temperature of approximately 160° F.; 4) peaches, apricots, plumes and nectarines—a concentration of 0.5-2% by weight and a temperature of approximately 160° F.

The concentration of caustic soda and/or enzymes in the treating solution 12/12H is controlled. Such control is accomplished, in part, via the use of a caustic soda and/or enzyme supply tank 150. The supply tank 150 may be connected to the apparatus 10, 10A, 110 at any point, such as to tank 30 or peeling conduit 18, and is shown in FIGS. 2-4 connected to pump 32 via pipe 152 and valves 154 and 156. A connection to pump 32, 132 (as appropriate) at, for example, its suction point may be beneficial so as to receive the benefit of a "mixing" effect within the pump 32. A caustic soda/enzyme pump 158, which may be a centrifugal pump, may be connected between the supply tank 150 and pump 32, 132 to assist in controlling a flow of concentrated caustic soda and/or enzymes into apparatus 10, 10A, 110. A metering valve 160 may be installed between pump 158 and pump 32 to control the flow of caustic soda and/or enzymes into the apparatus 10, 10A, 110. A measurement device 162 may be installed or connected to apparatus 10, 10A, 110 to measure the concentration level of caustic soda and/or enzymes in the treating solution 12/12H. Such a measurement device is shown connected, for example, to pipe 42B, 142B (as appropriate) where a side-stream of solution 12/12H is drawn from pipe 42B, 142B at location 164 and then flows via valve 166 into measurement device 162 and then is fed via valve 168 back into apparatus 10, 10A, 110 at location 170 of pipe 42B, 142B, as shown in FIGS. 2-4. It is within the scope of the present disclosure that if a volumetric metering pump, such as a diaphragm pump, (not shown) is used in place of centrifugal pump 158, the metering valve 160 may not be used. It is also within the scope of the present disclosure that the measurement device 162 may be connected to the metering valve 160 or the metering pump 158 to provide manual and/or automatic control of the concentration of caustic soda and/or enzymes in the treating solution 12/12H up to a desired level. The measurement device 162 may be an in-line conductivity transmitter to measure the chemistry of the solution 12/12H and/or the electrical conductivity of the solution 12/12H. The measurement device 162 may also include a computer to monitor and adjust the treating solution concentration by, for example, directing an opening or closing of the metering valve 160, as appropriate.

The embodiment shown in FIG. 3, referred to as apparatus 10A, is constructed and operates essentially the same as apparatus 10 of FIG. 2, except for the following. Overflow opening 36 at feed vessel 14 is connected to container 64 via valve 52 and pipe 42J and is also connected to a drain sump 74 via pipe 42K and valve 58. Thus, the overflow from feed vessel 14 can be directed as needed by appropriately opening and/or closing valves 52 and 58. In addition, peeling conduit 18 can be at least partially drained via valve 56 via pipe 42E to tank 30.

The embodiment shown in FIG. 4, apparatus 110, includes some structural elements found in the embodiments of FIGS. 2 and 3 but differs in construction and operation in accordance with the following. The embodiments of FIGS. 2 and 3 include a vacuum system 44 and a peeling conduit 18 having an initial increase in elevation and a resulting drop in pressure from, for example, atmospheric pressure PA. However, the embodiment of FIG. 4 does not include a vacuum system but does includes a peeling conduit 118 having a initial decrease in elevation, taking advantage of gravity and resulting in a rise in pressure from, for example, atmospheric pressure PA. As mentioned earlier, the reference numbers in FIG. 4 use a "100" and "200" series designation to refer to structural elements similar or identical to those identified in the embodiments of FIGS. 2 and 3.

Apparatus 110 is arranged such that output opening 116 of feed vessel 114 is located at a first elevation $E_{400}$ and is at a first pressure $P_{400}$. Such first pressure $P_{400}$ may be, for example, essentially atmospheric pressure $P_A$ or approximately 14.9 PSIA. As shown in FIG. 4, peeling conduit 118 is arranged such that section 120 is connected at a first end 120A to feed vessel 114 at opening 116. Section 120 extends from opening 116 and drops in elevation through area 282 of peeling conduit 118 to a second elevation $E_{500}$ which is at a second pressure $P_{500}$. Second elevation $E_{500}$ is approximately 1-30 feet lower than first elevation $E_{400}$ and may be, in a particular mode, approximately eleven (11) feet lower than first elevation $E_{400}$. Second pressure $P_{500}$ is higher than first pressure $P_{400}$ end may be approximately 21 PSIA. Section 120 connects at a second end 120B to section 122 at first end 122A. Section 122 continues at second elevation $E_{500}$ and second pressure $P_{500}$ through area 283 of peeling conduit 118. Section 122 connects, at a second end 122B, to section 124 at a first end 124A which is at second elevation $E_{500}$ and second pressure $P_{500}$. Section 124 then rises in elevation through area 284 of peeling conduit 118 and reaches a third pressure $P_{600}$ and a third elevation $E_{600}$ which is where a second end 124B connects to separator 128 via discharge connection 126. Third elevation $E_{600}$ is essentially equal to first elevation $E_{400}$ and third pressure $P_{600}$ is essentially equal to first pressure $P_{400}$.

The peeling conduit 118 is constructed such that an inside diameter is approximately 1-48 inches and may, in a particular mode, be approximately 14 inches, for example, when the agricultural products AP are tomatoes.

Treating solution 112, 112H is comprised essentially the same as treating solution 12, 12H, as discussed earlier, as are tank 130, separator 28, pump 132, heating device 134 and feed vessel 114.

Before apparati 10 and 10A are placed in a production or operational mode, each apparatus is primed. The priming is done to create a liquid barometric seal 40 in the peeling conduit 18, as reflected, inter alia, by the levels of treating solution $L_F$ and $L_T$ in the first and third sections 20, 24, respectively, of the peeling conduit 18. The liquid barometer seals 40 permit the vacuum system 44 to create at least a partial vacuum PV in the peeling conduit 18 and bring the treating solution 12, 12H to a level $L_{TS}$ in, for example, section 22, which represents at least a partially filled level $L_{PF}$ as shown in FIGS. 2 and 3. The liquid barometric seals 40 also further permit a siphon effect 38 to be created in the peeling conduit 18 at the outlet end 48 when the apparati 10, 10A are put into a production operation. The siphon effect 38 may allow the production operation to continue to occur even if the vacuum system 44 fails. However, without the vacuum system 44 operating, a vapor lock could occur in the peeling conduit 18 because of air released from the immersed product IAP.

Using the apparatus 10 of FIG. 2 as an example, the priming occurs as follows. The tank 30 of the apparatus 10 is at least partially filled with a liquid LQ, which may be water or may be treating solution 12. Valves 50, 51 and 53 are opened and valves 54 and 56 are closed. This connects the tank 30, feed vessel 14, pump 32, peeling conduit 18 and the separator 28 and prevents liquid LQ from draining out of the peeling apparatus 10. The pump 32 is turned on, thereby circulating the liquid LQ via the heating device 34 (which may or may not be turned on), the feed vessel 14, the peeling conduit 18 and the separator 28. A liquid barometric seal 40 is created opposite ends 18A, 18B of the peeling conduit 18 by the following steps: flooding the feed vessel 14 with the liquid LQ; having the liquid LQ flow into first section 20 of the peeling conduit 18 up to a level $L_T$, which is essentially equal to a first height $H_I$ in the feed vessel 14; having overflow of the liquid LQ from the feed vessel 14 flow into container 64 having weir 66; the weir 66 has a height $H_w$ in the container 64 that is equal to or lower than a level of the liquid LQ at height $H_o$ of outlet end 48 of the peeling conduit 18; liquid LQ forms reservoir R in the container 64 with a portion LQA of the liquid LQ flowing over the weir 66 into the tank 30; another portion LQB of the liquid LQ flows out of the container 64 into gooseneck GN of third section 24 of the peeling conduit 18 and up to a level L in the gooseneck GN that is equal to or below the height $H_w$ of the weir 66. With the establishment of levels $L_T$ and $L_F$ and the barometric seals 40, the apparatus 10 is primed. With the liquid barometric seals 40 in place, when the apparatus 10 is turned on for production operation mode, siphoning effect 38 should exist at outlet 48. A visual indicator may confirm that the liquid barometric seals 40 exist (not shown).

For priming of apparatus 10A, the process works essentially the same as for apparatus 10 except that valves 50, 51, 52 and 53 are opened and valves 54 and 58 are closed.

Apparatus 110 does not need to be primed since no liquid barometric seals or siphon effect are necessary.

The production operation mode of the apparati 10 and 10A is as follows. Numerical designations for both apparati may be included for clarity, as appropriate. Each apparatus 10, 10A is primed to create liquid barometric seals 40 at ends 18A, 18B of the peeling conduit 18. Valves 50, 51, 54 and 58 are in an opened condition thereby connecting the tank 30, pump 32, feed vessel 14, peeling conduit 18 and the separator 28. Opening valve 58 creates an escape route for liquid LQ or treating solution 12, 12H if feed vessel 14 gets clogged or if too much liquid LQ is fed by pump 32. Valves 52, 53 and 56 are in a closed condition. The tank 30 is at least partially filled with treating solution 12, 12H. The pump 32, having been turned on, is thereby circulating the treating solution 12, 12H via heating device 34, feed vessel 14, peeling conduit 18 and separator 28. The liquid barometric seals 40 were created at opposite ends 18A, 18B of the peeling conduit 18 during priming. The vacuum system 44 is turned on. The vacuum system 44 is sealably connected to the peeling conduit 18 at section 22 of the peeling conduit 18. The vacuum control 60 of the vacuum system 44 is adjusted to attain essentially full exhaustion of air from first and third sections, 20, 24, respectfully, of peeling conduit 18 and at least a partial exhaustion of air from second section 22 of peeling conduit 18. The air being exhausted from peeling conduit 18 through vacuum system 44 results in at least a partial vacuum PV sufficient to assist in lifting treating solution 12, 12H into second section 22 and to maintain the treating solution 12, 12H at a desired fill level, for example, level $L_{TS}$ or $L_{PF}$ in the second section 22 of peeling conduit 18. Treating solution 12, 12H, having been drawn from the first and third sections 20, 24, respectively, thereby fills those sections 20, 24.

During operation, the pump 32 can be adjusted to provide a desired treating solution 12, 12H flow rate F, the flow rate F being assisted by the at least partial vacuum PV created in the peeling conduit 18 and the siphon effect 38 established by a difference in height $H_l$ between a liquid level $L_{FV}$ in the feed vessel 14 and the liquid level L in the outlet end 48 of the peeling conduit 18. If desired, and done so for this description, heating device 34 is turned on to heat the treating solution 12 as the treating solution 12 transits the heating device 34 to be circulated through the apparatus 10, 10A.

Continuing the production operation, agricultural products AP to be peeled are delivered 98 to the feed vessel 14 via a weighing or volume measuring device shown, for example, as a conveyor 99 in FIGS. 2-3. The products AP are immersed 100 in the heated treating solution 12H, forming a mixture M in the feed vessel 14. The immersed agricultural products AP are at least partially infused with the heated treating solution 12H, thereby initiating at least a partial peeling of the immersed agricultural products AP. Mixture M is transported 200 over a first predetermined period of time $T_{100}$ in the first section 20 of the peeling conduit 18. The first section 20 having a first end 20A being essentially at the first pressure $P_{100}$ and essentially at the first elevation $E_{100}$, and having a second end 20B being at a second pressure $P_{200}$ and at a second elevation $E_{200}$. Mixture M is further transported 300 over a second predetermined period of time $T_{200}$ in the second section 22 of the peeling conduit 18, the second section 22 having first and second ends 22A, 22B essentially at the second elevation $E_{200}$ and essentially at the second pressure $P_{200}$. Mixture M is further transported 400 over a third predetermined period of time $T_{300}$ in the third section 24 of the peeling conduit 18, the third section 24 having a first end 24A at essentially the second elevation $E_{200}$ and essentially at the second pressure $P_{200}$, and having a second end 24B at a third elevation $E_{300}$ and at a third pressure $P_{300}$. Mixture M is brought to a level L in outlet end 48 of the third section 24 that is essentially at the third elevation $E_{300}$ and mixture M, at this point, includes at least partially peeled products PP and heated treating solution 12H. Mixture M is fed into separator 28 wherein the at least partially peeled products PP and the heated treating solution 12H are separated.

The operation of apparatus 110 is as follows. Valve 159 is opened to connect the treating solution tank 130 to the pump 132. Valve 158 is in a closed position. Apparatus 110 does not have to be primed because there is no need to establish liquid seals or to create a siphon effect. However, it may be necessary to run a liquid LQ, such as treating solution 112 or 112H through the apparatus 110 to check out the flow and to check for leaks. When pump 132 is turned on, liquid LQ which, for illustrative purposes, is heated treating solution 112H, originates from tank 130 and flows through pipe 142A, heating device 134 and into feed vessel 114 at essentially first elevation $E_{400}$ and first pressure $P_{400}$. In area 281, heated treating solution 112H is mixed with agricultural products AP resulting in mixture M. Mixture M flows out of feed vessel 114 through output opening 116 and into a first end 120A of section 120 of peeling conduit 118, also at first elevation $E_{400}$ and first pressure $P_{400}$.

First pressure $P_{400}$ is, for example, essentially atmospheric pressure, or 14.9 PSIA. Mixture M flows, via gravity, through area 282 of peeling conduit 118 over a first predetermined period of time $T_{400}$ to a second elevation $E_{500}$ at a second pressure $P_{500}$ where a second end 120B connects with a first end 122A of a second section 122. Second elevation $E_{500}$ is approximately 1-40 feet below first elevation $E_{400}$ and may be, in a particular mode, approximately eleven (11) feet lower than first elevation $E_{400}$. Second pressure $P_{500}$ is higher than first pressure $P_{400}$ and may be approximately 21 PSIA. Mixture M continues to flow through area 283 of peeling conduit 118 over a second predetermined period of time $T_{500}$ essentially being maintained at second elevation $E_{500}$ and second pressure $P_{500}$. At a second end 122B, section 122 connects with a first end 124A of a third section 124, also essentially at second elevation $E_{500}$ and second pressure $P_{500}$. From here, mixture M rises in third section 124 through area 284 of peeling conduit 118 over a third predetermined period of time $T_{600}$ up to a third elevation $E_{600}$ at a third pressure $P_{600}$ at second end 124B. Third elevation $E_{600}$ is essentially equal to first elevation $E_{400}$ and third pressure $P_{600}$ is essentially equal to first pressure $P_{400}$. Mixture M exits peeling conduit 118 at discharge connection 126 where the peeling conduit 118 has an outlet end 148 feeding into separator 128. In separator 128, mixture M, which includes the immersed IAP and at least partially peeled PP agricultural products and treating solution 112H, is separated. The heated treating solution 112H is returned to treating solution tank 130 and the at least partially peeled product PP is transported to be further processed (not shown).

Treating solution tank 130 includes an overflow opening 137 leading to vent 162 via pipe 142H. Feed vessel 114 includes an overflow opening 136 leading to vent 172 and sump 174 via pipe 142L. Liquid LQ or heated treating solution 112H can be drained from peeling conduit 118 via valve 158, pipes 142K and 142L and vent 172 to sump 174.

The use of the vacuum system 44, inter alia, in embodiments or apparati 10 and 10A and the changes in elevation and pressure appears to allow the at least partial peeling of the products AP to occur faster and at a lower temperature of the heated treating solution 12H, thereby doing less damage to the product below the skin and conserving energy and time. The use of the gravity feed in section 120 of apparatus 110 may also allow the at least partial peeling of the products AP to occur faster and at a lower temperature as well, thereby doing less damage to the product below the skin and also conserving energy and time. Ultimately, this may also lead to the use of a lower throughput final separator, possibly saving additional cost.

It is within the scope of the present disclosure that a controlling of the flow rate F, the composition (i.e., caustic soda and/or enzymes) and concentration of the treating solution and its temperature (if heated) as well as the size of the peeling conduit and amount and changes in elevation and pressure all may combine to provide the desired peeling of products by the methods and apparati described herein.

It is within the scope of the present disclosure that apparati 10, 10A and 110 could include a suction-type pump (not shown). The suction-type pump could replace pump 32 and be located such that, instead of "pushing" the liquid LQ or heated treating solution 12, 12H or mixture M through the apparati 10, 10A, 110, there would be a "pulling" or "sucking" effect and the suction pump would be located either in, or upstream or downstream of separator 28.

It is within the scope of this disclosure that products other than agricultural products may be peeled using the methods and apparati disclosed herein.

Although the present disclosure has been described and illustrated in detail, it is to be clearly understood that this is done by way of illustration and example only and is not to be taken by way of limitation. The spirit and scope of the present disclosure are to be limited only by the terms of the appended claims.

We claim:

1. A method of peeling agricultural products having skins, the steps comprising:
    immersing the agricultural products to be peeled in a treating solution in a first area of a peeling apparatus, the immersed products and treating solution forming a mixture in the first area at a first pressure;
    transporting the mixture in a second area of the peeling apparatus, the second area having a first end at the first pressure and a second end at a second pressure;
    transporting the mixture in a third area of the peeling apparatus, the third area being at an essentially constant second pressure;
    transporting the mixture in a fourth area of the peeling apparatus, the fourth area having a first end at the second pressure and having a second end at a third pressure that is essentially equal to the first pressure;
    transporting the mixture from the fourth area to a separator, the separator being essentially at the third pressure; and
    further including the step of providing a liquid barometric liquid seal in one end of the second area and in one end of the fourth area by flooding a feed vessel in the first area and portions of the second and fourth areas with treating solution up to a predetermined height in the feed vessel and predetermined levels and in the second and fourth areas.

2. The method of claim 1, wherein the first pressure is essentially atmospheric pressure.

3. The method of claim 1, wherein the second pressure is less than the first pressure.

4. The method of claim 1, wherein the second pressure is greater than the first pressure.

5. The method of claim 1, wherein the second, third, and fourth areas are interconnected and form a part of a closed system to recirculate the treating solution and to facilitate transporting the mixture through the apparatus.

6. The method of claim 1, wherein the change of pressure between the first area and second area and between the third area and the fourth area is produced by a difference in elevation of at least portions of those areas.

7. The method claim 1, wherein the first area is at a first elevation.

8. The method of claim 1, wherein the second area begins at a first elevation and ends at a second elevation.

9. The method of claim 1, wherein the third area is essentially at a second elevation.

10. The method of claim 1, wherein the fourth area begins at a second elevation and ends at a third elevation.

11. The method of claim 1, wherein the second elevation is higher than the first elevation.

12. The method of claim 8, wherein the second elevation is lower than the first elevation.

13. The method of claim 10, wherein the third elevation is essentially the same as the first elevation.

14. The method of claim 11, wherein the mixture rises in the second area to the second elevation and the rise is caused by at least one of the following: a) a pump and b) a vacuum.

15. The method of claim 1, wherein the treating solution is heated.

16. The method of claim 15, wherein the heated treating solution includes an active ingredient of one or more of the following: a) sodium hydroxide and b) potassium hydroxide.

17. The method of claim 1, wherein the treating solution comprises an active ingredient including at least one of the following: a) a caustic soda and b) an enzyme.

18. A method of peeling agricultural products having skins, the steps comprising:
    immersing the agricultural products to be peeled in a treating solution in a first area of a peeling apparatus, the immersed products and treating solution forming a mixture in the first area at a first pressure;
    transporting the mixture in a second area of the peeling apparatus, the second area having a first end at the first pressure and a second end at a second pressure;
    transporting the mixture in a third area of the peeling apparatus, the third area being at an essentially constant second pressure;
    transporting the mixture in a fourth, area of the peeling apparatus, the fourth area having a first end at the second pressure and having a second end at a third pressure that is essentially equal to the first pressure;
    transporting the mixture from the fourth area to a separator, the separator being essentially at the third pressure; and
    further including the step of creating at least a partial vacuum in the second, third and fourth areas such that air in the second and fourth areas is fully exhausted and air in the third area is at least partially exhausted through a vacuum system, and the treating solution is drawn from the second and fourth areas, thereby filling the second and fourth areas and at least partially filling the third area with treating solution up to a desired level.

19. A method of peeling agricultural product is having skins, the steps comprising:
    immersing the agricultural products to be peeled in a treating solution in a first area of a peeling apparatus, the immersed products and treating solution forming a mixture in the first area at a first pressure;
    transporting the mixture in a second area of the peeling apparatus, the second area having a first end at the first pressure and a second end at a second pressure;
    transporting the mixture in a third area of the peeling apparatus, the third area being at an essentially constant second pressure;
    transporting the mixture in a fourth area of the peeling apparatus, the fourth area having a first end at the second pressure and having a second end at a third pressure that is essentially equal to the first pressure;
    transporting the mixture from the fourth area to a separator, the separator being essentially at the third pressure; and
    further including the step of forming a siphon by having the following: a) a barometric liquid seal in a first end of the second area and in a second end of the fourth area, b) a difference in height between a liquid level at height in a feed vessel in the first area and a liquid level L in an outlet end of the fourth area, and c) at least a partial vacuum in the second, third, and fourth areas.

20. A method of priming a peeling apparatus for peeling agricultural products having skins, the steps comprising:
    providing a peeling apparatus having a plurality of pipes and valves, a feed vessel, a pump, a separator, a tank, a liquid, a container, a heating device and a peeling conduit;
    filling the tank of the apparatus with the liquid;
    opening at least one of the plurality of valves to connect the feed vessel with the pump and the separator;
    closing at least one of the plurality of valves to prevent the liquid from draining out of the peeling apparatus;
    starting the pump and circulating the liquid via the heating device, at least one of the plurality of pipes, the feed vessel, the peeling conduit and the separator; and
    providing a liquid barometric seal at opposite ends of the peeling conduit by
        flooding the feed vessel with the liquid up to at least a first height,
        having the liquid flow into a first section of the peeling conduit up to a level essentially equal to the first height in the feed vessel,
        having overflow of the liquid from the feed vessel flow into the container having a weir, the weir having a height in the container that is equal to or lower than a level of the liquid at an outlet end of the peeling conduct,
        having the liquid form a reservoir in the container with a portion of the liquid flowing over the weir into the tank, and
        having another portion of the liquid flowing out of the container into an end of a third section of the peeling conduit up to a level that is equal to or below the height of the weir.

21. A method of operating a peeling apparatus for peeling agricultural products having skins, the steps comprising:
    providing a peeling apparatus having a plurality of valves, pipes, a feed vessel, a pump, a vacuum system, a separator, a tank, a controlled treating solution, a container, a heating device and a peeling conduit;
    opening at least one of the plurality of valves to connect the feed vessel with the pump and the separator;
    closing at least one of the plurality of valves to prevent the treating solution from draining out of the peeling apparatus;
    filling the tank of the apparatus with the treating solution;
    starting the pump and circulating the treating solution via the heating device and at least one of the plurality of pipes, the feed vessel, the peeling conduit and the separator;
    providing a liquid barometric seal at opposite ends of the peeling conduit;
    starting the vacuum system, the vacuum system being sealably connected with at least one section of the peeling conduit;
    adjusting a vacuum control of the vacuum system to attain essentially full exhaustion of air from a first and a third section of the peeling conduit and at least a partial exhaustion of air from a second section of the peeling conduit, the air being exhausted from the peeling conduit through the vacuum system resulting in at least a partial vacuum sufficient to lift the treating solution into the second section and to maintain the treating solution at a desired fill level in the second section of the peeling conduit, the treating solution having been drawn from the first and third sections at opposite ends, respectively, of the peeling conduit, thereby filling the first and third sections and at least partially filling the second section of the peeling conduit with treating solution up to the desired fill level;
    adjusting the pump to provide a desired treating solution flow rate, the flow rate being enabled by the at least partial vacuum created in the peeling conduit and a siphon established by a difference in height between a liquid level in the feed vessel and an outlet end of the peeling conduit;
    operating the heating device to heat the treating solution as the treating solution moves thorough the heating device, the now heated treating solution flowing through the apparatus;
    delivering agricultural products to be peeled to the feed vessel;
    immersing the agricultural products to be peeled in the heated treating solution thereby forming a mixture in the feed vessel, the feed vessel having an output opening at a first elevation and being at a first pressure, and the agricultural products being at least partially infused with the heated treating solution, thereby initiating at least a partial peeling of the immersed agricultural products;
    transporting the mixture over a first predetermined period of time in a first section of the peeling conduit, the first section having a first end being essentially at the first pressure and essentially at the first elevation, and a second end being at a second pressure and at a second elevation;
    further transporting the mixture over a second predetermined period of time in a second section of the peeling conduit, the second section having first and second ends essentially at the second elevation and essentially at the second pressure;
    further transporting the mixture over a third predetermined period of time in a third section of the peeling conduit, the third section having a first end at essentially the second elevation and essentially at the second pressure, and a second end at a third elevation and at a third pressure, the mixture being brought to a level in an outlet end of the third section that is essentially at the third elevation, the mixture including at least partially peeled products and heated treating solution; and
    further transporting the mixture to a separator wherein the at least partially peeled products and the heated treating solution are separated.

* * * * *